(12) United States Patent
Jha et al.

(10) Patent No.: US 10,996,664 B2
(45) Date of Patent: May 4, 2021

(54) PREDICTIVE CLASSIFICATION OF FUTURE OPERATIONS

(71) Applicant: Mitsubishi Electric Research Laboratories, Inc., Cambridge, MA (US)

(72) Inventors: Devesh Jha, Cambridge, MA (US); Wenyu Zhang, Ithaca, NY (US); Emil Laftchiev, Cambridge, MA (US); Daniel Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 241 days.

(21) Appl. No.: 16/369,109

(22) Filed: Mar. 29, 2019

(65) Prior Publication Data

US 2020/0310400 A1 Oct. 1, 2020

(51) Int. Cl.
*G05B 23/02* (2006.01)
*G06N 3/04* (2006.01)

(52) U.S. Cl.
CPC ....... *G05B 23/024* (2013.01); *G05B 23/0254* (2013.01); *G06N 3/0454* (2013.01)

(58) Field of Classification Search
CPC .............. G05B 23/024; G05B 23/0254; G05B 23/0283; G06N 3/0454; G06N 3/0481
See application file for complete search history.

(56) References Cited

U.S. PATENT DOCUMENTS

| | | | | |
|---|---|---|---|---|
| 8,775,341 | B1 * | 7/2014 | Commons | G10L 15/16 706/20 |
| 9,760,827 | B1 * | 9/2017 | Lin | G06N 3/04 |
| 10,210,451 | B2 * | 2/2019 | Lin | G06N 3/063 |
| 10,678,253 | B2 * | 6/2020 | Zeng | B60W 50/14 |
| 10,692,004 | B1 * | 6/2020 | Segev | G06N 3/08 |
| 10,891,799 | B2 * | 1/2021 | Zhu | G06N 3/08 |
| 2020/0292608 | A1 * | 9/2020 | Yan | G05B 23/0208 |

* cited by examiner

*Primary Examiner* — Mohammad K Islam
(74) *Attorney, Agent, or Firm* — Gennadiy Vinokur; Hironori Tsukamoto

(57) ABSTRACT

A system evaluates a plurality of faults in an operation of a machine at a set of future instances of time. The system uses a neural network including a first subnetwork sequentially connected with a sequence of second subnetworks for each of the future instance of time such that an output of one subnetwork is an input to a subsequent subnetwork. The first subnetwork accepts the current time-series data and the current setpoints of operation of the machine. Each of the second subnetworks accepts the output of a preceding subnetwork, an internal state of the preceding subnetwork, and a future setpoint for a corresponding future instance of time. Each of the second subnetworks outputs an individual prediction of each fault of a plurality of faults at the corresponding future instance of time.

15 Claims, 15 Drawing Sheets

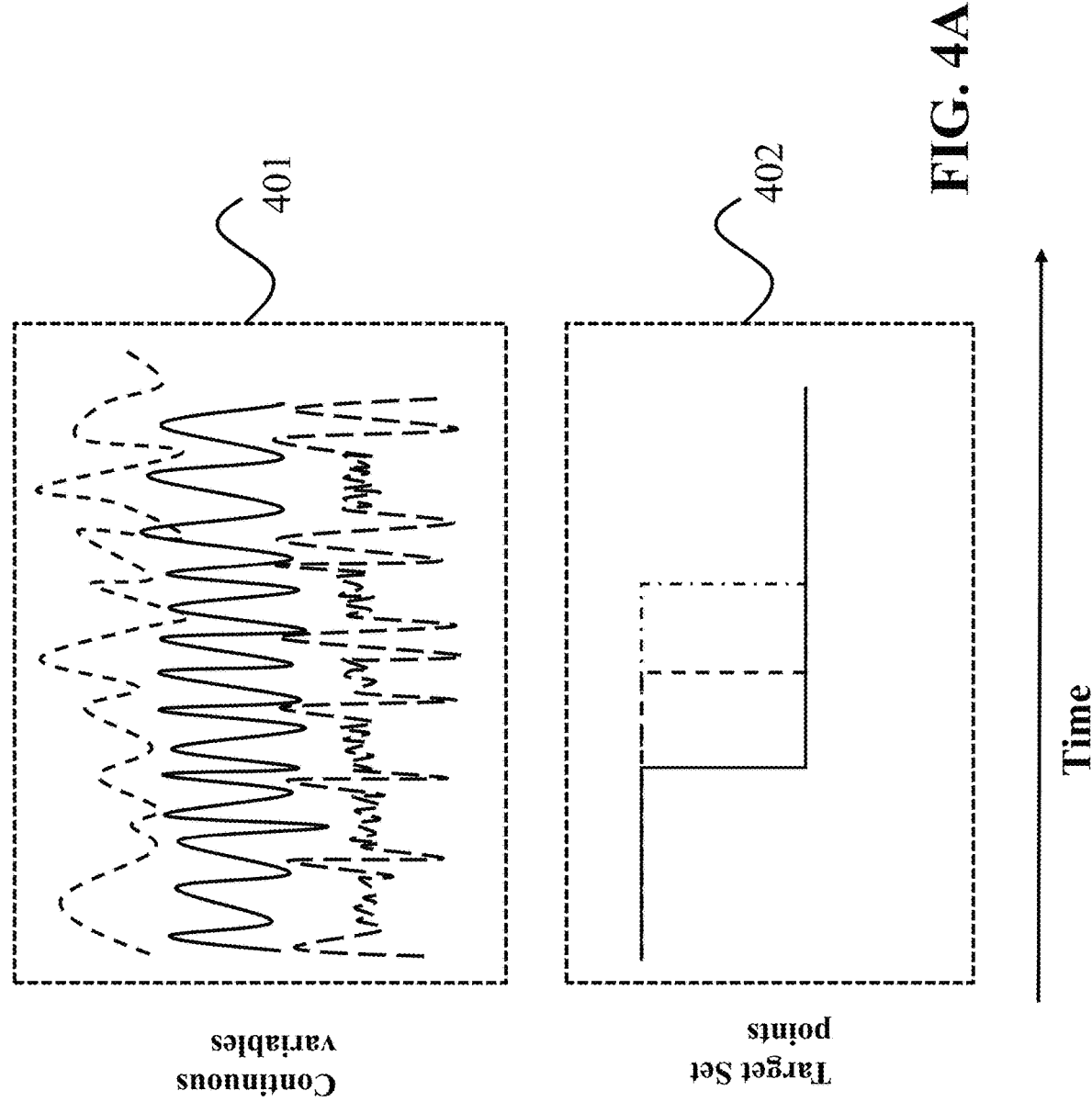

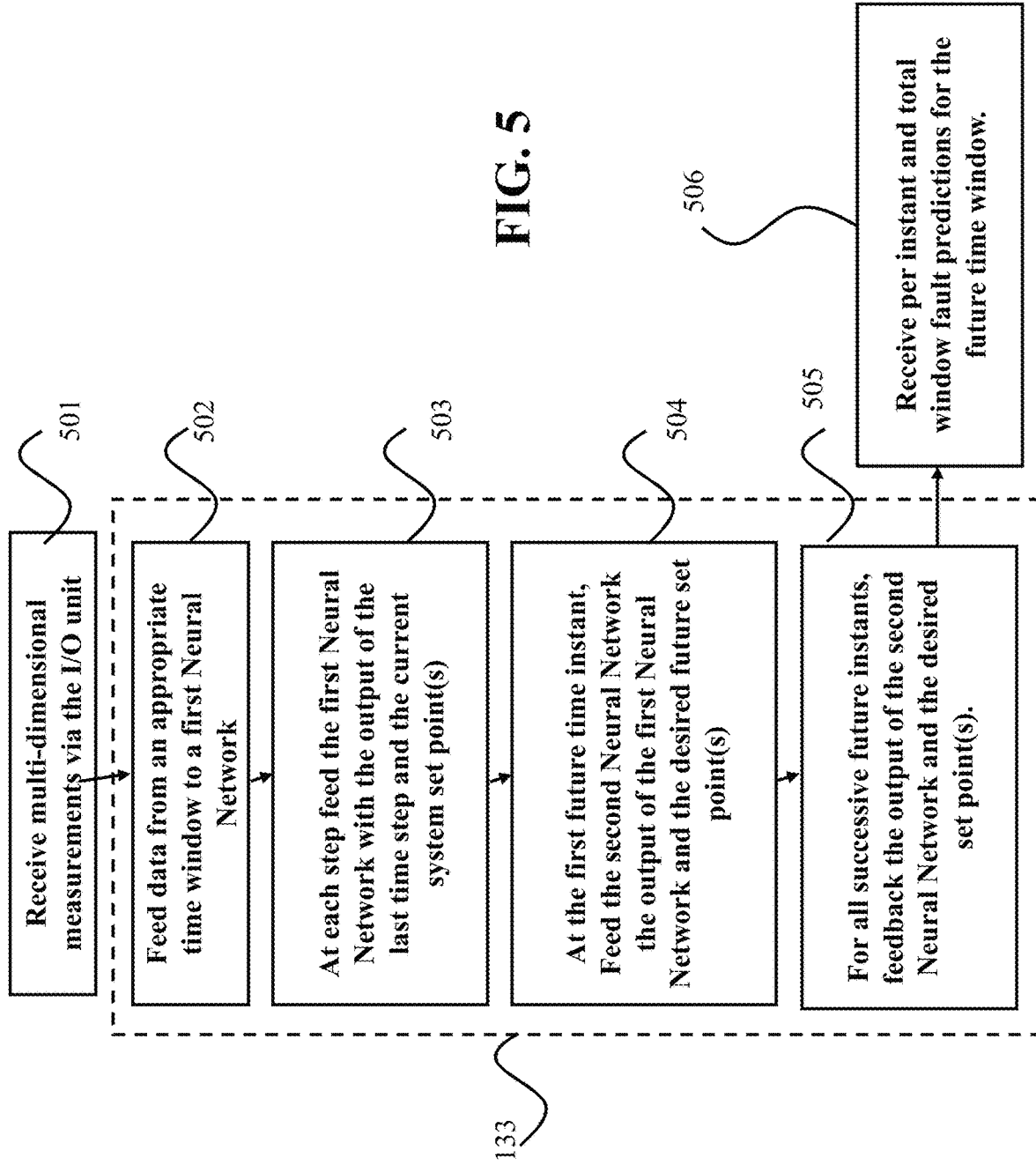

PREDICTIVE CLASSIFICATION OF FUTURE OPERATIONS

TECHNICAL FIELD

The present disclosure relates generally to fault classifiers and more particularly to classifiers capable to predict and classify future events in the system.

BACKGROUND

A time series is a series of data points indexed in time. Most commonly, a time series is a sequence of measurements taken at successive points in time. Thus it is a sequence of discrete-time data. Examples of time series are heights of ocean tides, stock exchange rates, sequence of measurements of operations of various systems like temperature measurements for an air-conditioning system. This disclosure is mainly related to measurements of time-series data in human-engineered systems. With the recent advancements in sensing and communication techniques, there has been an explosion in the amount of data that modern machines generate. Some examples of time series collected from a machine operation include measurements of vibrations in a process of opening and closing an elevator door, measurement of temperature and pressure variations across a plant, etc. Increasingly, for a number of practical industrial systems, the time series data representing their operations are multidimensional, i.e., collected from multiple sensors at each instance of time. This is a consequence of the proliferation of cheap distributed sensors, ubiquitous connectivity, and available on-demand cloud storage. These together are commonly referred to as the internet of the things.

Modern human-engineered systems have grown exponentially in complexity and, are oftentimes, comprised of multiple interconnected systems working together. The end goal for these systems is autonomous operation requiring minimum human intervention for prognostics and diagnostics. For efficient diagnostics of these systems, it is important to be able to predict future faults/events depending on the future operating set points of the system. Consequently, many industrial applications require identification of conditions or regimes (no-fault, type-1 fault, type-2 fault, etc.) as they may occur in future operation of a system. Even though modern machines/systems generate data at a very high pace and volume, there are still very few machine learning techniques that can analyze it efficiently. The problem of automatic determination and prediction of these regimes or conditions remains open because of large dimensional data, complex dynamics in sequential multi-dimensional data, and poor data set labeling. Apart from this, most of the modern machinery are built to operate normally for very long periods of time. In general, for most of these systems, faults occur very rarely. Furthermore, in the multiple fault setting, several faults can occur simultaneously and thus, lead to a large number of possibilities. For example, some faults occur more frequently than others, or in some instances multiple faults can occur together, etc. This leads to the problem where a machine learning algorithm is provided with a problem instance where the possible classes are highly imbalanced in the training set.

Additionally, it is desirable that the learning algorithm can predict an operating regime of the machine over a prediction horizon appropriate for the system. The difficulty in predicting of events compounds as the prediction horizon becomes longer. The prediction problem is particularly difficult for multidimensional time-series as it is difficult to learn the precise precursor dynamics (which could be present in an unknown lower-dimensional manifold) to faults of different kinds. Since the classes are imbalanced, learning of this hidden manifold might be diluted by the imbalance due to the ill-posed optimization problem for the machine learning algorithm. This might lead to poor generalization in test cases. In the setting where multiple faults can occur simultaneously, this problem becomes further challenging as the learning algorithm has to learn the predictive precursors to a combinatorial number of events (probably for all possible combination of faults). Most of the autonomous systems face these problems for the purposes for prognostics and diagnostics.

Accordingly, there is a need for "prediction" of future events in the operation of the system in addition or instead of "detection" of current events. While the detection problem has been very well studied in prognostics literature (see, for example, M. Jones, D. Nikovski, M. Imamur and T. Hirata "Anomaly detection in real-valued multi-dimensional time-series", in 2014 International Conference on Big Data), fault prediction is still considered challenging and is an open research topic.

For example, time series analysis comprises methods for analyzing time series data in order to extract meaningful statistics and other characteristics of the data. One example of time series analysis is time series forecasting. Here a model is used to predict future values of the time series based on previously observed values. Critically, a model is required to accomplish this task, and the determination of this model is a central task in time series analysis as the models of many systems are simply not available. For fully labeled data, that is data where each data point has been annotated by a skilled operator, forward prediction can be done on the basis of Markov models. Here an iterative strategy is used with the models See, e.g., Jesse Read, Luca Martino, and Jaakko Hollmn, "Multilabel methods for prediction with sequential data," Pattern Recognition, vol. 63, pp. 45-55, 2017. However, Markov models work well mostly for discrete systems, and thus, the applicability of Markov models is very limited. Consequently, machine learning systems that can accurately predict future operations of complex systems are still evasive, however, can be very useful, if done properly.

Thus there is a need for data-driven classification of future operations of a system from multidimensional time series data indicative of the future operation of the system.

SUMMARY

It is an object of some embodiments to provide a system and a method for data-driven classification of future operation of a system from a certain history of multidimensional time series data as well as future operating conditions of the system. Additionally or alternatively, it is an object of some embodiments to provide such a system and a method that are suitable for predicting a fault in the operation of the system at a future instance of time. Additionally or alternatively, it is an object of some embodiments to provide such a system and a method that are suitable for predicting a multi-label fault from a multidimensional fault space. Hence, some embodiments are capable to indicate different types of fault in complex industrial systems. Examples of such systems include industrial plants: like water processing plants, power plants, or waste processing plants; or industrial machinery like train locomotives, train cars, turbines, or large scale motors.

Some embodiments are based on recognition that time series data of current operation of the system can capture not only the current state of a system, but also dynamics of the system (or the dynamics of fault evolution) and thus can be used to predict a future state (indicative of faults) for the system. That future state of the system can be further used for classification to produce classification results of the future operation of the system. However, data-driven (model-free) prediction of the future state of the system is a notoriously difficult problem. Some approximations can be performed for relatively simple systems with, e.g., one dimensional state. However, data-driven prediction for complex multidimensional systems is challenging. This is primarily because a small error in prediction of time-series is very soon compounded in future prediction steps and thus any classification based on the predicted data would lead to misleading results.

Some embodiments are based on recognition that feature learning or representation learning is a set of machine learning techniques that allows a system to automatically discover the representations advantageous for feature detection or classification from raw data. However, some embodiments are based on realization that when such a feature representation is discovered, the representation can be used not only for detection or classification, but for other tasks as well.

Specifically, some embodiments are based on realization that when a feature learning is performed for multidimensional time series data for classification purposes, the resulting feature representation inevitably captures and/or encapsulate the dynamics hidden in the time series data. This is in part because in intricate classification problems, the time points viewed discretely do not immediately reveal the underlying state, and when mapped to a reduced dimension, the data points are implicitly mapped to a space where there is a relationship among the data points. Such a feature representation of multidimensional time series data may be in a quite low dimension, but still captures the relevant dynamics of the system. This condensing reduces time dimensionality of the time series data, which makes the resulting feature representation simpler for future predictions.

The advantage of learning an appropriate set of features is that it can recover the relevant information, based on a suitable cost function, in a much smaller dimensional space than the original data. Typically, it is difficult to detect system (or machine) states and regimes directly from the measurements of the system for the reasons listed above. However, the information contained in the system measurement can be learned through a non-linear mapping of the sensor data into an embedded space with less dimensions that in the original input space of operation of the system. Here a non-linear mapping is advantageous because it is this non-linearity that captures the dynamics within time series dimensions, and the relationships between time series dimensions. In particular, the feature learning can be designed to embed the sensor measurements into an abstract space where different regimes are separated into distinct clusters. Here the centroids of the cluster have the property that they attract (via the embedding method) new data points such that once learned the embedding can be used to classify the embedded data. Such a clustering is advantageous for classification, but also advantageous for future predictions. This is because in time series analytics, clusters in the embedded space represent the dynamics of the time series generation process. Thus, if correctly discovered, the embedding method can accurately learn predictive dynamics for different states of the system (e.g., which kinds of fault occur at what point in future).

Some embodiments are based on recognition that even well learned features, when used for future prediction can be periodically calibrated to improve prediction and/or classification accuracy. However, such a calibration is typically not possible within the prediction window of the time series. Nonetheless, such calibration is possible in systems where there is some known information about the future. Examples of such information include control set points for desired operating parameters (temperature, rpm, speed), and/or holistic descriptions of operation regimes. This is because the future set point of the system can be used intrinsically in a statistical model such as a neural network to guide predictions from the embedded space about the future state of the system.

To that end, some embodiments learn representation of the historical multidimensional time series data in an appropriate embedded space advantageous for prediction of abstract/hidden system state in that embedded space. Because the embedded space is advantageous for classification, the future predictions in that embedded space can be classified as well. The embedded space is discovered or learned to reduce dimensionality of the data and/or increase the separation of the dimensions of the data. This technique help to both predict the data and classify the predicted data, which is an original purpose of the representation learning.

Some embodiments are based on recognition that prediction of faults of the system in the embedded space can be performed with help of a neural network. In such a manner, a transformation of the time series data of the operation of a system into embedded space evolution of the embedded data in the embedded space for the corresponding future instance of time can be learn rather than programmed.

Some embodiments are based on the realization that in most mechanical systems or machines, faults have precursors that are useful for prediction of faults at future instances. For instance, some of the fault conditions or system state (learned in the embedded space) may be indicative of faults occurring at future instances of time. To that end, some embodiments predict future states one time-instant at a time and feedback this prediction to make predictions at further future instances in time. To this end, a suitable neural network structure is used that allows training for prediction one-step at a time which can be then fed back for predicting future system states.

Some embodiments are based on realization that a specific structure of the neural network can guide the trained neural network to perform desired functions. To that end, some embodiments use a neural network including a first subnetwork sequentially connected with a sequence of second subnetworks such that an output of one subnetwork is an input to a subsequent subnetwork. The objective of the first subnetwork is to transform the measurements of the operation of a system into an embedded space. Hence, the first subnetwork is arranged first in the sequence of subnetworks, such that the output of the first subnetwork is an input to the first of the second subnetworks in the sequence of second subnetworks. The first subnetwork accepts current time-series data collected from multiple sensors measuring the operation of the system over a period of time including multiple time instances up to a current instance of time. In addition, the first subnetwork accepts a set of current set points for the operation of the system within the period of time. As such, the first subnetwork possesses all information necessary for transformation.

In the sequence of second subnetworks, there is a second subnetwork for each of the future instance of time within the prediction horizon. For example, if an embodiment aims to predict faults for a prediction horizon including four instances of time from a current time instance, the neural network includes a sequence of four second subnetworks, each corresponding to a particular future instance of time within the prediction horizon. The objective of each second subnetwork is to estimate evolution of the embedded data in the embedded space for the corresponding future instance of time. To that end, each of the second subnetworks accepts output from the preceding subnetwork (either first subnetwork or preceding second subnetwork) and also accepts a future set point for a corresponding future instance of time. The output of the previous subnetwork preserves the dynamics of fault evolution in the embedded space. The future set point for a corresponding future instance of time allows conditioning of dynamics evolution according to the future setpoint. The output of each of the second subnetworks an individual prediction of each fault of a plurality of faults at the corresponding future instance of time.

When the neural network has the specified above structure as well as input/output relationship, it is believed that the first subnetwork is guided to perform the nonlinear transformation into the embedded space to achieve better fault separation results in multi-label fault space. It is also believed, the each of the second subnetwork is guided to evolve the embedded data while preserving their structure. For example, in one embodiment, the first subnetwork is trained to transform the time series data into the embedded space to reduce a classification error of the prediction of each fault at the current instance of time performed by the classifier on the corresponding embedded data; and the second subnetwork is trained to predict embedded data for a next instance of time from embedded data for a previous point of time without observations on time series data collected up to the next point of time to reduce an error between predicted embedded data for the next point of time and embedded data for the next point of time transformed by the first subnetwork from the time series data collected up to the next point of time. In such a manner, the performance of the trained neural network can be verified.

The outputs of the second subnetwork can serve as indication of the fault conditions, because the data separation in the embedded space is advantageous for classifying. Additionally or alternatively, a shallow, e.g., a binary classifier, can classify an output of each or the last second subnetwork to produce a binary vector of fault predictions. In some implementations, the classifier is a third neural network jointly trained with the first subnetwork and the sequence of the second subnetworks.

In some embodiments, the first subnetwork and the sequence of the second subnetworks are jointly trained to reduce a loss function. The loss function can discretize the faults to enforce independence on classification of each fault. For example, in one embodiment, the loss function estimates a first prediction error for a first fault and a second prediction error for a second fault independently from each other. In the setting, where multiple faults can occur simultaneously, estimating a combination of the faults is a combinatorial problem. In effect, such a loss function enforcing independence on fault estimation can allow estimating multiple faults without combinatorial computational difficulties.

Accordingly, one embodiment discloses a system for evaluating a plurality of faults in an operation of a machine at a set of future instances of time forming a prediction horizon. The system includes an input interface configured to accept, during the operation of the machine, input data including current time-series data collected from multiple sensors measuring the operation of the machine over a period of time including multiple time instances up to a current instance of time; a set of current set points for the operation of the machine within the period of time; and a set of future set points of the operation of the machine for a set of future instances of time forming a prediction horizon; a memory configured to store a neural network including a first subnetwork sequentially connected with a sequence of second subnetworks such that an output of one subnetwork is an input to a subsequent subnetwork, wherein there is a second subnetwork for each of the future instance of time within the prediction horizon, wherein the first subnetwork accepts the current time-series data and the current setpoints, wherein each of the second subnetworks accepts the output of a preceding subnetwork, an internal state of the preceding subnetwork, and a future setpoint for a corresponding future instance of time, and wherein each of the second subnetworks outputs an individual prediction of each fault of a plurality of faults at the corresponding future instance of time; a processor configured to submit the input data received from the input interface to the neural network to estimate individual predictions of each fault of the plurality of faults at each of the future instances of time; and an output interface to output the individual predictions of each of the faults.

Another embodiment discloses a method for evaluating a plurality of faults in an operation of a machine at a set of future instances of time forming a prediction horizon, wherein the method is coupled with stored instructions implementing the method, wherein the instructions, when executed by the processor carry out steps of the method. The method includes accepting, during the operation of the machine, input data including current time-series data collected from multiple sensors measuring the operation of the machine over a period of time including multiple time instances up to a current instance of time; a set of current set points for the operation of the machine within the period of time; and a set of future set points of the operation of the machine for a set of future instances of time forming a prediction horizon; submitting the input data received from the input interface to a neural network to estimate individual predictions of each fault of the plurality of faults at each of the future instances of time, the neural network including a first subnetwork sequentially connected with a sequence of second subnetworks such that an output of one subnetwork is an input to a subsequent subnetwork, wherein there is a second subnetwork for each of the future instance of time within the prediction horizon, wherein the first subnetwork accepts the current time-series data and the current setpoints, wherein each of the second subnetworks accepts the output of a preceding subnetwork, an internal state of the preceding subnetwork, and a future setpoint for a corresponding future instance of time, and wherein each of the second subnetworks outputs an individual prediction of each fault of a plurality of faults at the corresponding future instance of time; and outputting the individual predictions of each of the faults.

Yet another embodiment discloses a non-transitory computer readable storage medium embodied thereon a program executable by a processor for performing a method. The method includes accepting, during the operation of the machine, input data including current time-series data collected from multiple sensors measuring the operation of the machine over a period of time including multiple time instances up to a current instance of time; a set of current set points for the operation of the machine within the period of time; and a set of future set points of the operation of the machine for a set of future instances of time forming a prediction horizon; submitting the input data received from the input interface to a neural network to estimate individual predictions of each fault of the plurality of faults at each of the future instances of time, the neural network including a first subnetwork sequentially connected with a sequence of second subnetworks such that an output of one subnetwork is an input to a subsequent subnetwork, wherein there is a second subnetwork for each of the future instance of time within the prediction horizon, wherein the first subnetwork accepts the current time-series data and the current setpoints, wherein each of the second subnetworks accepts the output of a preceding subnetwork, an internal state of the preceding subnetwork, and a future setpoint for a corresponding future instance of time, and wherein each of the second subnetworks outputs an individual prediction of each fault of a plurality of faults at the corresponding future instance of time; and outputting the individual predictions of each of the faults.

BRIEF DESCRIPTION OF THE DRAWINGS

FIG. 4A and FIG. 4B show schematics of illustrating relationships between the measurements of the operation of the monitored machine, and current and future set points of the operation of the machine used by some embodiments.

FIG. 5 shows a schematic of a fault classification based on a predictive neural network according to some embodiments.

DETAILED DESCRIPTION

System Overview

Figure 1A:
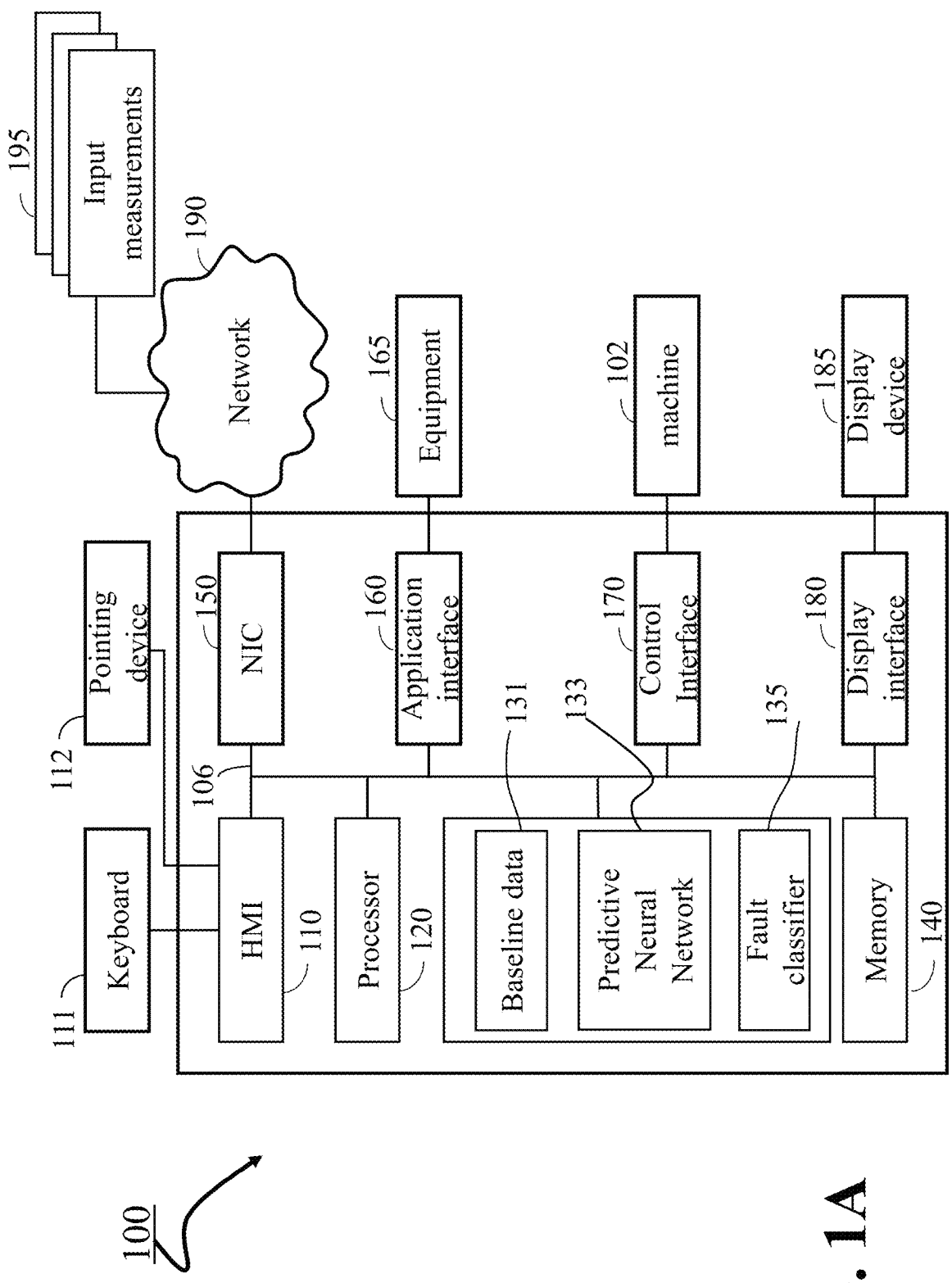
FIG. 1A and FIG. 1B show block diagrams of a system for detecting and/or classifying an anomaly in an operation of a machine according to some embodiments.
Figure 1B:
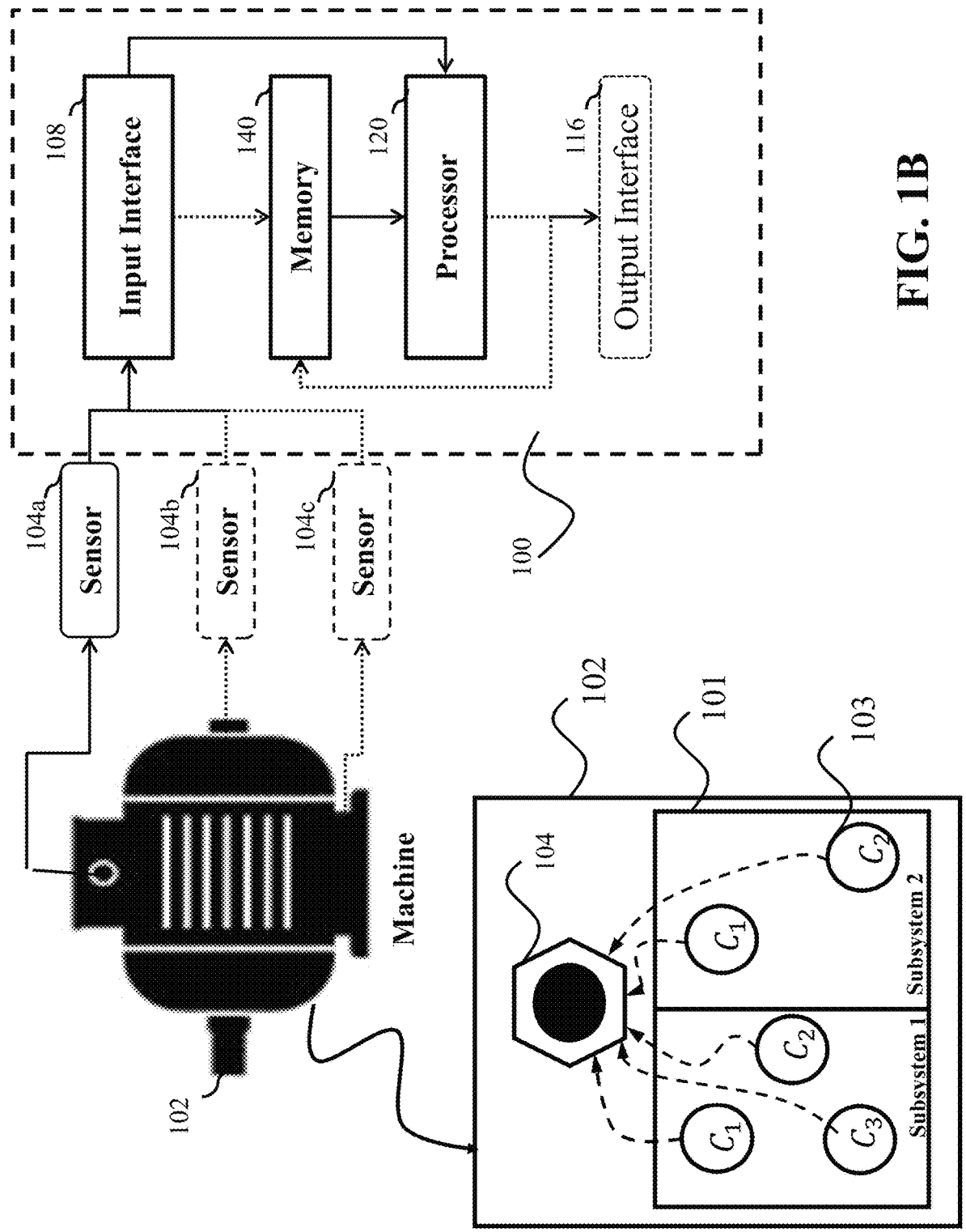

FIG. 1A and FIG. 1B show block diagrams of a system 100 for detecting and/or classifying an anomaly in an operation of a machine 102 according to some embodiments. The machine 102 may be a distributed system with multiple subsystems, for example, subsystem 101. In turn, each subsystem may include one or multiple components 103 connected to a coordinating device 104. Example of such a machine 102 is an air conditioning system including one outdoor unit connected to multiple indoor units. In some embodiments, the anomaly detection of the system 100 determines presence or absence of faults in the operation of the machine 102. Additionally or alternatively, in some embodiments, the anomaly detection of the system 100 classifies the type of the fault in the operation of the machine 102.

The system 100 can have a number of input 108 and output 116 interfaces connecting the system 100 with other systems and devices. For example, a network interface controller 150 is adapted to connect the system 100 through the bus 106 to a network 190. Through the network 190, either wirelessly or through the wires, the system 100 can receive input signal 195 including time series samples of measurements of an operation of the machine. The measurements of the input signal 195 are measurements from one or a combination of sensors 104a, 104b, and 104c or data derived from the measurements of physical variables of an operation of the machine. Examples of such physical variables include torque and/or voltages of a motor moving a mass, positions, velocities and/or acceleration of the mass, etc. A time series sample can be single- or multi-dimensional, i.e., one sample can include measurements of different physical quantities of the operation of the machine.

Additionally, the input interface 108 is configured to accept current and/or future set points that describe the target state of the system. A setpoint (also set point or set-point) is the desired or target value for a variable or process value of the machine 102. In some implementations, departure of such a variable from its set point is one basis for error-controlled regulation using negative feedback for automatic control. Example of set points for air conditioning system is a desired temperature in the conditioned environment. The combination of measurements of operation of machine and set points are referred herein as baseline data 131 used for anomaly detection and/or fault classification of the future operation of the machine.

In some implementations, a human machine interface 110 within the system 100 connects the system to a keyboard 111 and pointing device 112, wherein the pointing device 112 can include a mouse, trackball, touchpad, joy stick, pointing stick, stylus, or touchscreen, among others. Through the interface 110 or NIC 150, the system 100 can receive data, such as measurements of operation of the machine 102, setpoints for the current and future operation of the machine 102, and/or anomaly detection and fault classification thresholds.

The system 100 includes an output interface 116 configured to output the results of the anomaly detection and/or fault classification of the future operation of the machine. For example, the output interface can include a memory to render the results of anomaly detection and fault classification. For example, the system 100 can be linked through the bus 106 to a display interface 180 adapted to connect the system 100 to a display device 185, such as a computer monitor, camera, television, projector, or mobile device, among others. The system 100 can also be connected to an application interface 160 adapted to connect the system to equipment 165 for performing various operations. The system 100 can also be connected to a control interface 170 adapted to connect the system to the machine 102. For example, through the control interface 170, the system 100 can be configured to control the machine 102 based on results of anomaly detection and classification.

The system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through the bus 106 to one or more input and output devices. These instructions implement a method for detecting and/or classifying an anomaly in the future operation of the machine 102.

To that end, the system 100 includes a predictive neural network 133 trained to determine and output an individual prediction of each fault of a plurality of faults at the corresponding future instance of time. To that end, the predictive neural network 133 is formed by a sequential combination of subnetworks designed to implement principles of some embodiments, as described below.

In some embodiments, the processor 120 is configured to submit the input data, i.e., the baseline data 131, received from the input interface to the neural network 133 to estimate individual predictions of each fault of the plurality of faults at each of the future instances of time. Additionally or alternatively, in some embodiments the system 100 also includes a fault classifier 135 configured to classify the outputs of the neural network 133. For example, the classifier 135 can be a binary classifier trained to classify the predictions of each fault to produce a binary vector of a multi-label fault, such that the output interface 116 outputs the binary vector.

Problem Overview

It is an object of some embodiments to provide a system and a method for data-driven classification of future operation of a machine 102 from a certain history of multidimensional time series data as well as future operating conditions of the system. Additionally or alternatively, it is an object of some embodiments to provide such a system and a method that are suitable for determining a fault in the operation of the system at a future instance of time. Additionally or alternatively, it is an object of some embodiments to provide such a system and a method that are suitable for determining a multi-label fault from a multidimensional fault space. Hence, some embodiments are capable to indicate different types of fault in complex industrial systems. Examples of such systems include industrial plants: like water processing plants, power plants, or waste processing plants; or industrial machinery like train locomotives, train cars, turbines, or large scale motors.

Figure 2:
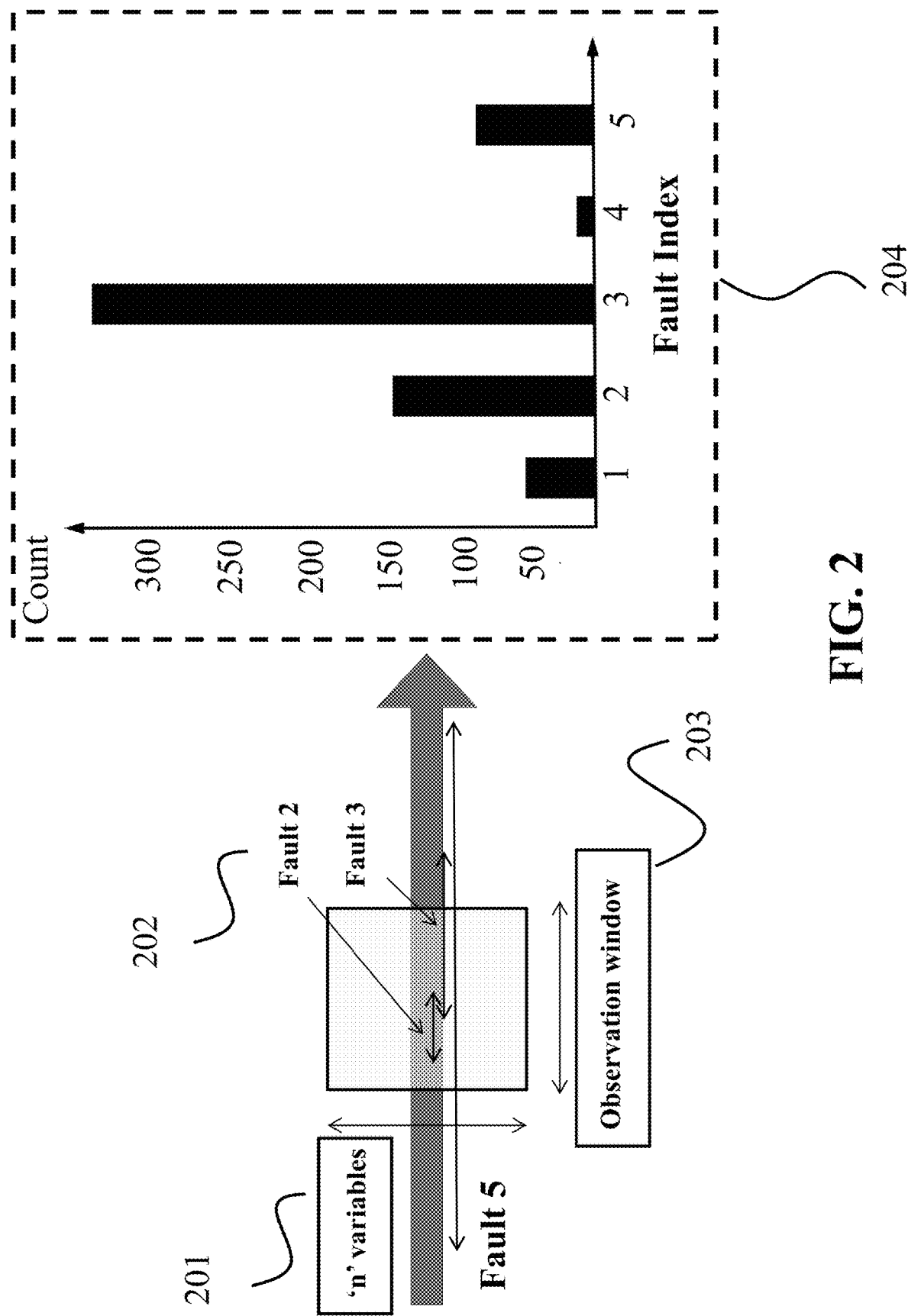
FIG. 2 shows a schematic illustrating variation of occurrences of multiple faults in diagnosed machine according to some embodiments.

FIG. 2 shows a schematic illustrating variation of occurrences of multiple faults in diagnosed machine according to some embodiments. The faults are predicted on multidimensional time series 201, and are such that they occur individually but may occur during overlapping observation time intervals 203. In any observation window of time 203 in a time series, there is a possibility of concurrent and/or overlapping occurrence 202 of the faults. Therefore the difficulty of predicting these faults is compounded both because prediction is occurring at some future instant and because the number of possible combinations of faults exponentially increases in the number of possible faults. In addition, some faults may occur exceedingly rarely as shown in 204. The histogram 204 shows that multiple fault types occur, where some fault types are rare.

Some embodiments are based on recognition that time series data of current operation of the system can capture not only the current state of a system, but also dynamics of the system and thus can be used to predict a future state of the system. That future state of the system can be further used for classification to produce classification results of the future operation of the system. However, data-driven (model-free) prediction of the future state of the system is a notoriously difficult problem. Some approximations can be performed for relatively simple systems with, e.g., one dimensional state. However, data-driven prediction for complex multidimensional systems is challenging. This is primarily because a small error in prediction of time-series is very soon compounded in future prediction steps and thus any classification based on the predicted data would lead to misleading results.

Some embodiments are based on recognition that feature learning or representation learning is a set of machine learning techniques that allows a system to automatically discover the representations advantageous for feature detection or classification from raw data. However, some embodiments are based on realization that when such a feature representation is discovered, the representation can be used not only for detection or classification, but for other tasks as well.

Specifically, some embodiments are based on realization that when a feature learning is performed for multidimensional time series data for classification purposes, the resulting feature representation inevitably captures and/or encapsulate the dynamics hidden in the time series data. This is in part because in intricate classification problems, the time points viewed discretely do not immediately reveal the underlying state, and when mapped to a reduced dimension, the data points are implicitly mapped to a space where there is a relationship among the points. Such a feature representation of multidimensional time series data may be quite low in dimension, but still captures the dynamics of the system. This condensing reduces time dimensionality of the time series data, which makes the resulting feature representation simpler for future predictions.

Figure 3:
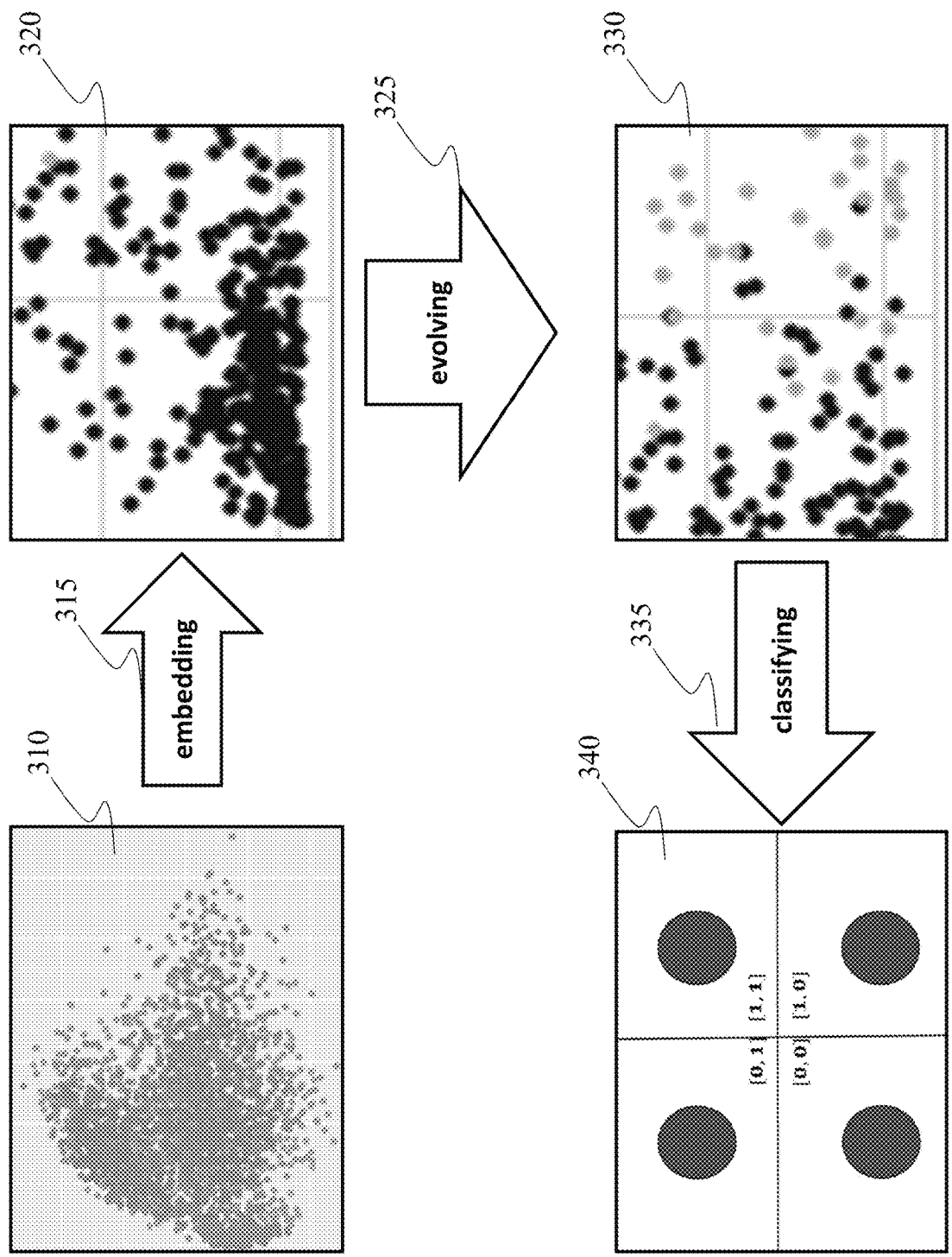
FIG. 3 shows a schematic of principles of fault classification used by some embodiments.

FIG. 3 shows a schematic of principles of fault classification used by some embodiments. In some embodiments, a number and types of the sensors 104a-c form dimensions of an operation space 310. To that end, some embodiments transform or embed 315 the time series data in the operation space into embedded data in an embedded space 320 with dimensions less than the dimensions of the operation space. Such a transformation 315 is performed based on the principles of feature learning such that the embedded space 310 is advantageous for classification. Next, some estimate of the evolution 325 of the embedded data 320 in the embedded space 330 for the corresponding future instance of time given the expected system set point. Some embodiments recognized the possibility of such evolution 325 due to preservation of dynamics of data in the operational space 310 in the embedded space 320. The data 330 is a prediction of the future state of the machine 102 in the embedded space. To that end, the prediction of the embedded data 330 can be classified 335 to estimate future faults 340 of the machine 102. In effect, the principles of some embodiments allows for data driven classification of future faults of the machine.

In such a manner, some embodiments learn representation of the historical multidimensional time series data at some embedded space advantageous for classification and predict future multidimensional time series data in that embedded space. Because the embedded space is advantageous for classification, the future predictions in that embedded space can be classified well. The embedded space is selected to reduce dimensionality of the data and/or increase the separation of the dimensions of the data. This approach helps to both predict the data and classify the predicted data, which is an original purpose of the representation learning.

Some embodiments are based on recognition that even well learned features, when used for future prediction can be periodically calibrated to improve prediction and/or classification accuracy. However, such a calibration is typically not possible within the prediction window of the time series. Nonetheless, such calibration is possible in systems where there is some known information about the future. Examples of such information include control set points for desired operating parameters (temperature, rpm, speed), and/or holistic descriptions of operation regimes. This is because the future set point of the system can be used intrinsically in a statistical model such as a neural network to guide predictions from the embedded space about the future state of the system.

Figure 4B:
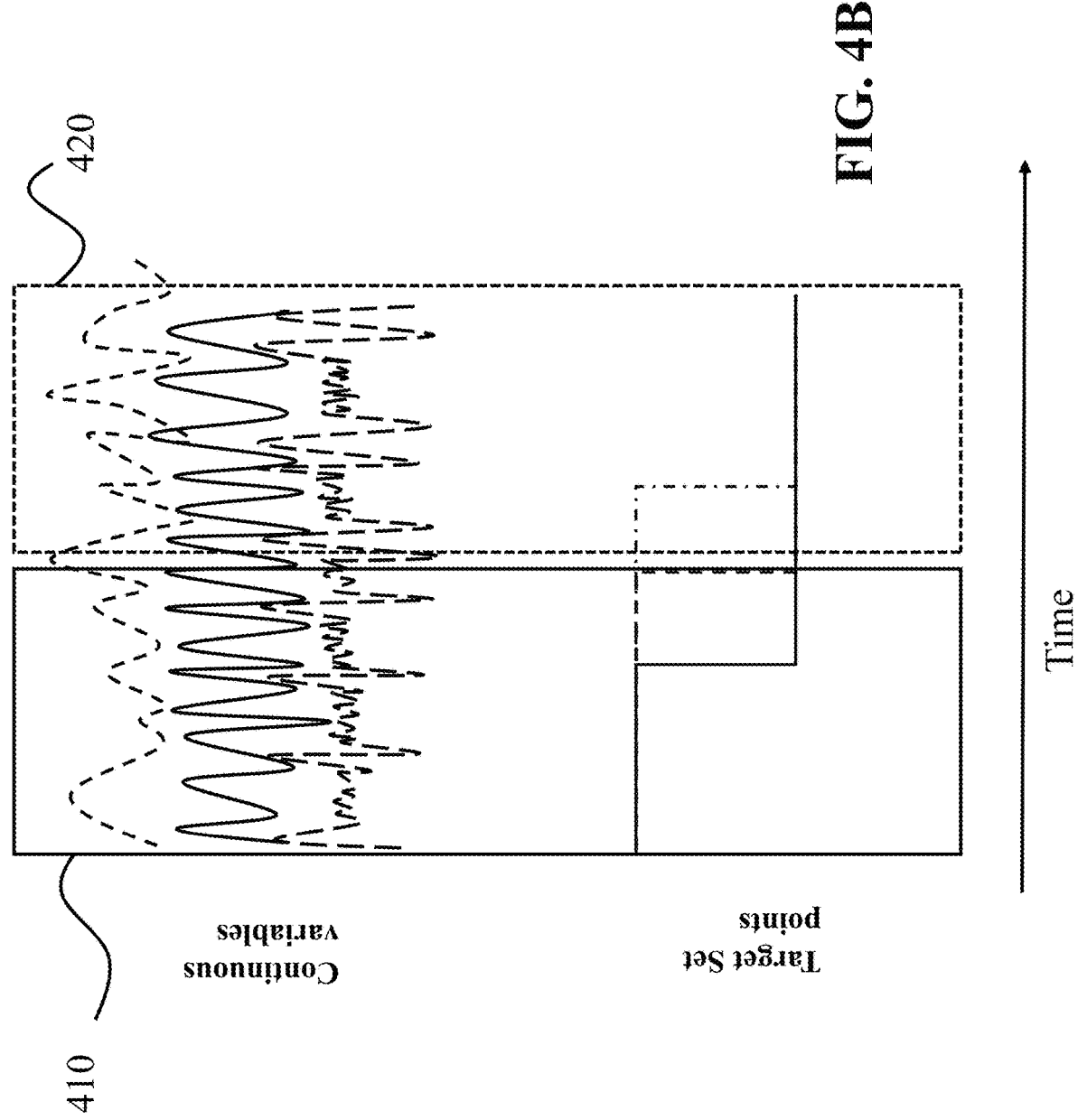

FIG. 4A and FIG. 4B show schematics of illustrating relationships between the measurements of the operation of the monitored machine, and current and future set points of the operation of the machine used by some embodiments. In various embodiments, neither the time series, nor the target set points are stationary. Note in FIG. 4 that the expected observed time series are continuous 401, and the target set points 402 are changing. Hence, it is expected the input to the system 100 to be continuously changing. Also, in various embodiments, the set points need not be the same in the observed and future time windows. Note in FIG. 5 the observed time window 410, and the future prediction window 420 over which the fault prediction is being carried out. In this example, the set points are different, and in fact changing at the time that future prediction begins. This is advantageous, because fault detection is often most needed when a regime change in a system is being executed.

Implementation Overview

Some embodiments are based on recognition that prediction of faults of the system in the embedded space can be performed with help of a neural network. In such a manner, a transformation of the time series data of the operation of a system into embedded space evolution of the embedded data in the embedded space for the corresponding future instance of time can be learn rather than programmed.

FIG. 5 shows a schematic of a fault classification based on a predictive neural network according to some embodiments. The neural network 133 includes a first subnetwork 502 sequentially connected with a sequence of second subnetworks 504 such that an output of one subnetwork is an input to a subsequent subnetwork. There is a second subnetwork for each of the future instance of time within the prediction horizon, wherein the first subnetwork accepts the current time-series data and the current set points 503, wherein each of the second subnetworks accepts the output of a preceding subnetwork and a future set point for a corresponding future instance of time 505, and wherein each of the second subnetworks outputs an individual prediction of each fault of a plurality of faults at the corresponding future instance of time 506.

More specifically, data is received in the system using the input device 501. The data is then partitioned into suitably chosen time windows and fed sequentially into the first neural subnetwork 502. For each time step, the input data is augmented by inputting system set points 503 that describe the current desired operation of the system. The output of this first subnetwork is then fed into a second subnetwork 504 along with future desired set points. For each desired prediction step, the output of this second subnetwork, along with the desired future set point 505 is fed back into the second subnetwork. This produces a per instant fault prediction 506, and at the end of the future prediction a total prediction window fault prediction, again 506.

Some embodiments are based on the realization that prediction of faults, which may be correlated, requires some kind of a predictive model which can use the current state of the system and make predictions of faults over a certain prediction horizon. Some embodiments are based on the realization that it is difficult to predict faults or learn the dynamics of time-series in the original high-dimensional space and thus, it is desirable to learn a small dimensional representation for the multi-dimensional measurements for the time-series.

Some embodiments are based on the realization that prediction of time-series data is a much more complex task due to the high-dimensional complex, correlations which might be present between the different components of the data. It is, however, easier to learn the dynamics of the faults occurring in the system using a low-dimensional representation of the time-series data in an abstract space. Some embodiments are based on the realization that for accurate prediction of faults over a certain prediction horizon, the faults predicted by the algorithm at every instant of time should be taken into account as the faults may be correlated and thus prediction of a fault at a time-instant 'k' might affect of the probability of occurrence of the fault at a future instant 'k+1'. Additionally, this information could also be useful in the multi-fault setting as some faults could always occur together or some faults never occur together and thus, this can simplify learning of the fault dynamics. As a result of this motivations, some embodiments of the disclosure predict faults one step at a time, and then the predicted fault is fed back to the algorithm for making predictions on the faults occurring in future over a finite window of time.

Some embodiments are based on the realization that a future fault of for a system should depend on the desired operating point or set-point for the system. For example, an event may be normal for a particular desired set-point of the system while it may be completely undesirable and thus faulty for another set-point. Thus the machine learning algorithm should take as an input the desired set-point of operation for the plant and use it for prediction of future faults. Some embodiments of the disclosure are based on the realization that for most of the engineered systems, the desired set-point of operation is always known. For example, a machine is always operated to perform a certain task like maintain a certain temperature, pressure for a controlled system. Thus the fault prediction algorithm can use the desired set-point of operation of the machine for future fault prediction.

Some embodiments are based on realization that a specific structure of the neural network can force the trained neural network to perform desired functions. To that end, some embodiments use a neural network including a first subnetwork sequentially connected with a sequence of second subnetworks such that an output of one subnetwork is an input to a subsequent subnetwork. The objective of the first subnetwork is to transform the measurements of the operation of a system into an embedded space. Hence, the first subnetwork is arranged first in the sequence of subnetworks, such that the output of the first subnetwork is an input to the first of the second subnetworks in the sequence of second subnetworks. The first subnetwork accepts current time-series data collected from multiple sensors measuring the operation of the system over a period of time including multiple time instances up to a current instance of time. In addition, the first subnetwork accepts a set of current set points for the operation of the system within the period of time. As such, the first subnetwork possesses all information necessarily for transformation.

In the sequence of second subnetworks, there is a second subnetwork for each of the future instance of time within the prediction horizon. For example, if an embodiment aims to predict faults for a prediction horizon including four instances of time from a current time instance, the neural network includes a sequence of four second subnetworks, each correspond to a particular future instance of time within the prediction horizon. The objective of each second subnetwork is to estimate evolution of the embedded data in the embedded space for the corresponding future instance of time. To that end, each of the second subnetworks accepts output from the preceding subnetwork (either first subnetwork or preceding second subnetwork) and also accepts a future set point for a corresponding future instance of time. The output of the previous subnetwork preserves the dynamics of faults in the embedded space. The future set point for a corresponding future instance of time indicates a desired evolution of dynamics of the system. The output of each of the second subnetworks an individual prediction of each fault of a plurality of faults at the corresponding future instance of time.

Figure 6:
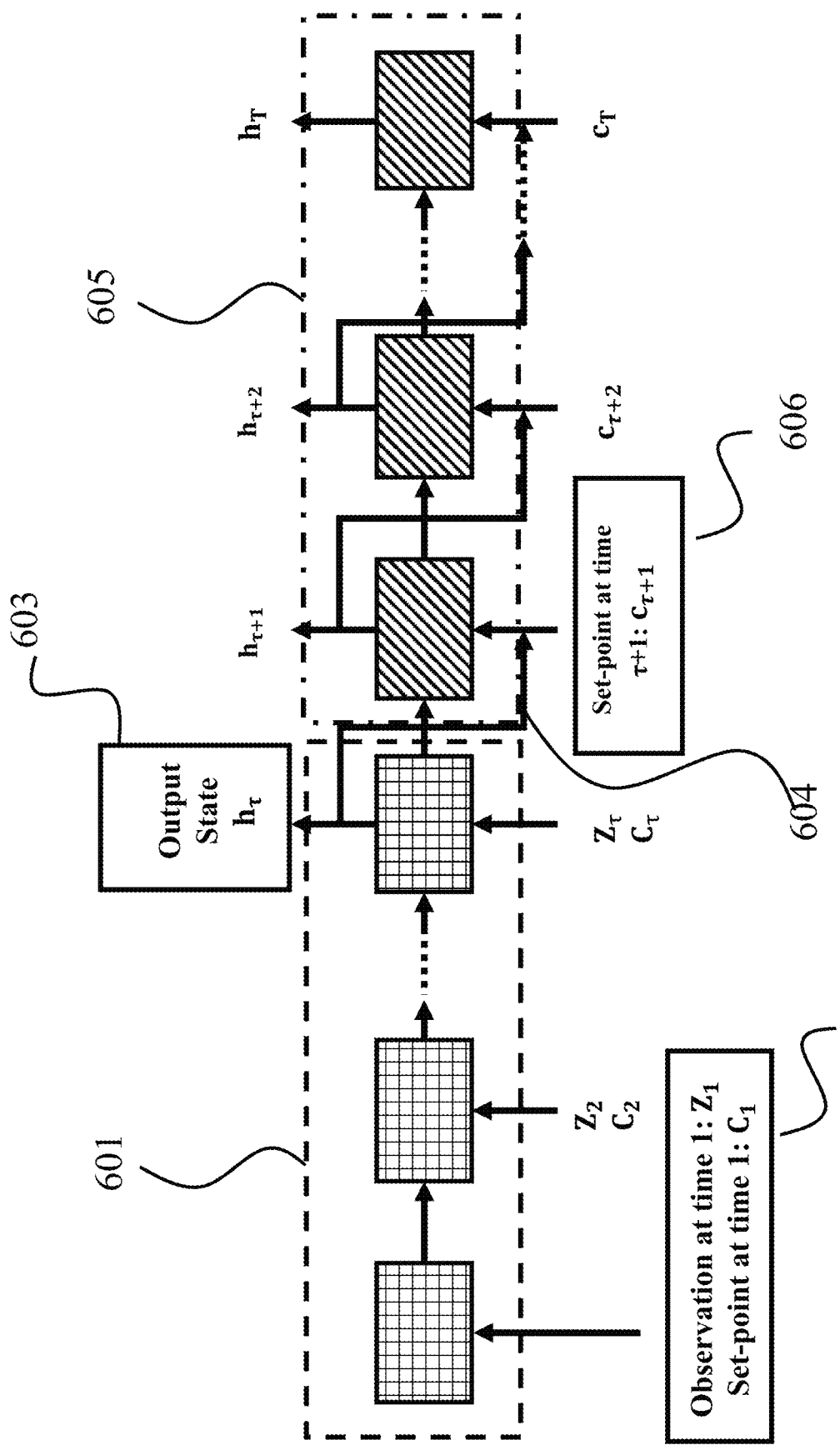
FIG. 6 shows a schematic of an exemplar structure of a neural network used for fault classification according to some embodiments.

FIG. 6 shows a schematic of an exemplar structure of a neural network used for fault classification according to some embodiments. In this example, the first subnetwork 601 is connected to a sequence of second subnetworks 605. The first subnetwork 610 includes recurrent long-short-term memory (LSTM) neural network layers, each of which has an input 602 made up of observations at a particular time instant, set points of the system and the output a previous time of the first subnetwork. After all observed time instances have been fed to the network, the final network output 603 is the final state of that network. This is input into the second subnetwork which is also include recurrent (LSTM) neural network layers, whose input is at first the output state 603 of the first subnetwork 601 along with the future set points 606. In subsequent steps the second subnetworks output is used as an input to the network.

Figure 7:
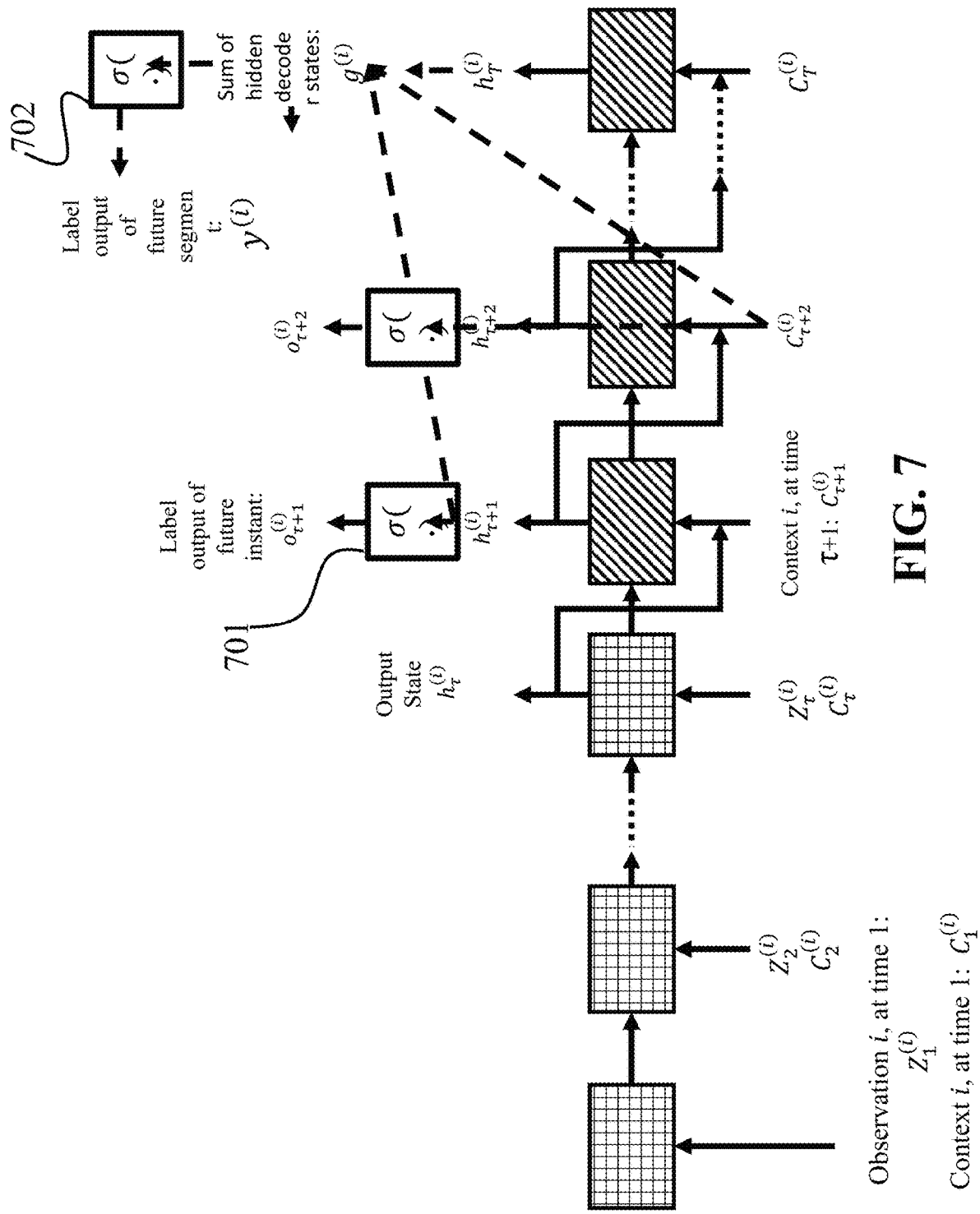
FIG. 7 shows a schematic of fault classification using the neural network of FIG. 6 according to some embodiments.

FIG. 7 shows a schematic of fault classification using the neural network of FIG. 6 according to some embodiments. In some embodiments, the utilized neural networks along with the translation method used to convert the network output to labels of faults at discrete instances in the future and on the entire future segment. For example, in one embodiment, the prediction of faults at any instant in time in the future is performed by taking the sigmoid transformation 701 of the state of the second subnetwork. Fault prediction on the total future window is carried out by taking a sigmoid transformation on the sum of states during the future interval of the second subnetwork 702.

When the neural network has specified above structure as well as input/output relationship, it is believed that the first subnetwork is forced to perform the nonlinear transformation into the embedded space to achieve better fault classification results in multi-label fault space. It is also believed, the each of the second subnetwork is forced to evolve the embedded data while preserving their structure. For example, in one embodiment, the first subnetwork is trained to transform the time series data into the embedded space to reduce a classification error of the prediction of each fault at the current instance of time performed by the classifier on the corresponding embedded data; and the second subnetwork is trained to predict embedded data for a next instance of time from embedded data for a previous point of time without observations on time series data collected up to the next point of time to reduce an error between predicted embedded data for the next point of time and embedded data for the next point of time transformed by the first subnetwork from the time series data collected up to the next point of time. In such a manner, the performance of the trained neural network can be verified.

The outputs of the second subnetwork can serve as indication of the fault conditions, because the data separation in the embedded space is advantageous for classifying. Additionally or alternatively, a shallow, e.g., a binary classifier, can classify an output of each or the last second subnetwork to produce a binary vector of fault predictions. In some implementations, the classifier is a third neural network jointly trained with the first subnetwork and the sequence of the second subnetworks.

Neural Network Training

Figure 8A:
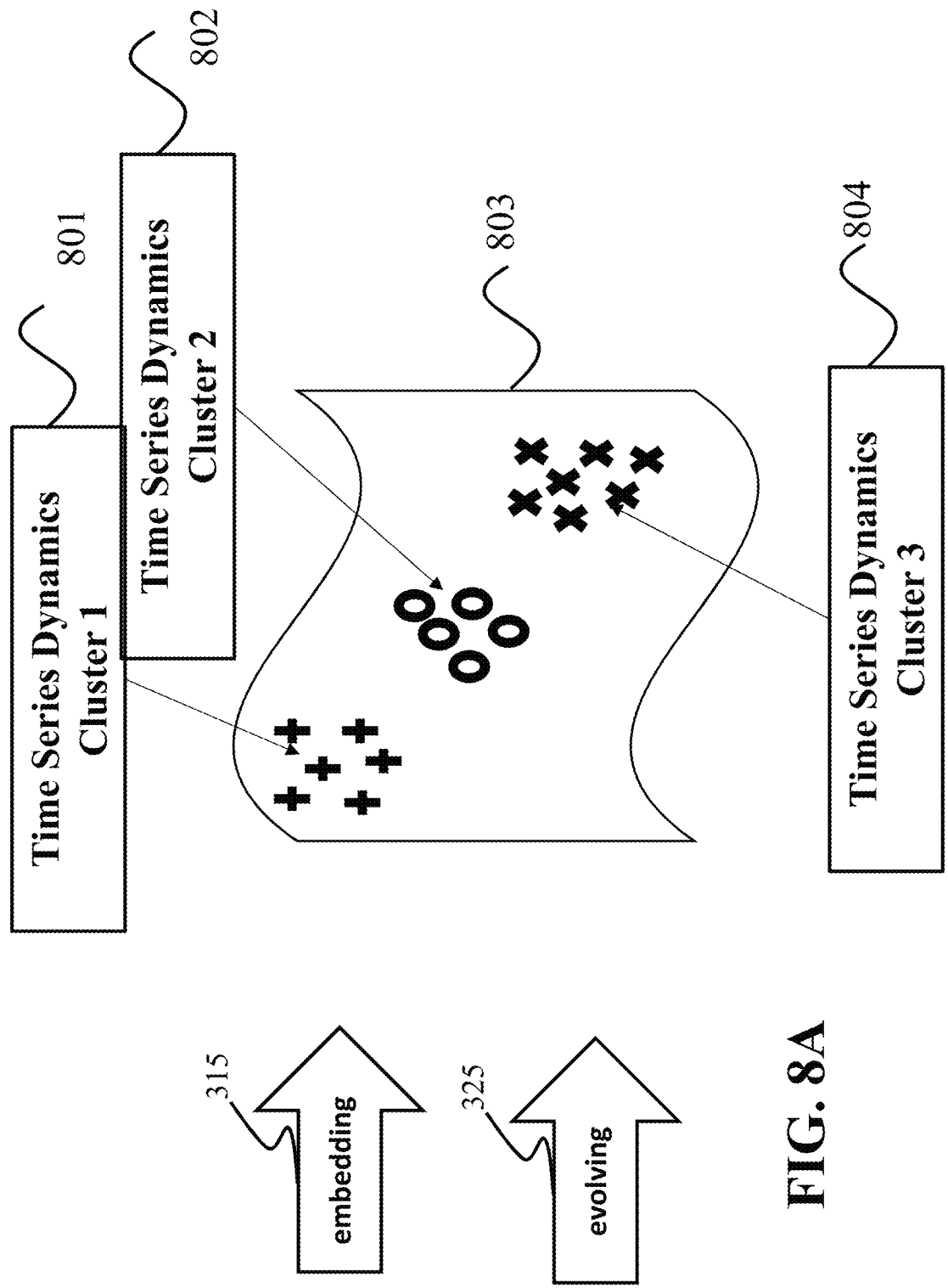
FIG. 8A shows a schematic of the embedded space used by some embodiments to classify the future faults of the monitored machine.

FIG. 8A shows a schematic of the embedded space used by some embodiments to classify the future faults of the monitored machine. The embedded space 803 has dimensions less than the dimensions of the original operating space measured by the sensors. Additionally or alternatively to dimensionality reduction, the embedded space is such that it reduces classification error during fault prediction because it tends to learn the dynamics of the time series and fault evolution. In the example of FIG. 8, the embedded space 803 has three time series dynamics clusters 801, 802, and 803. These embedded clusters are learned automatically during training of the system herein by designing a suitable cost function to guide the search of the embedded space. This automatic learning in turn ensures that the fault prediction error is minimized.

Figure 8B:
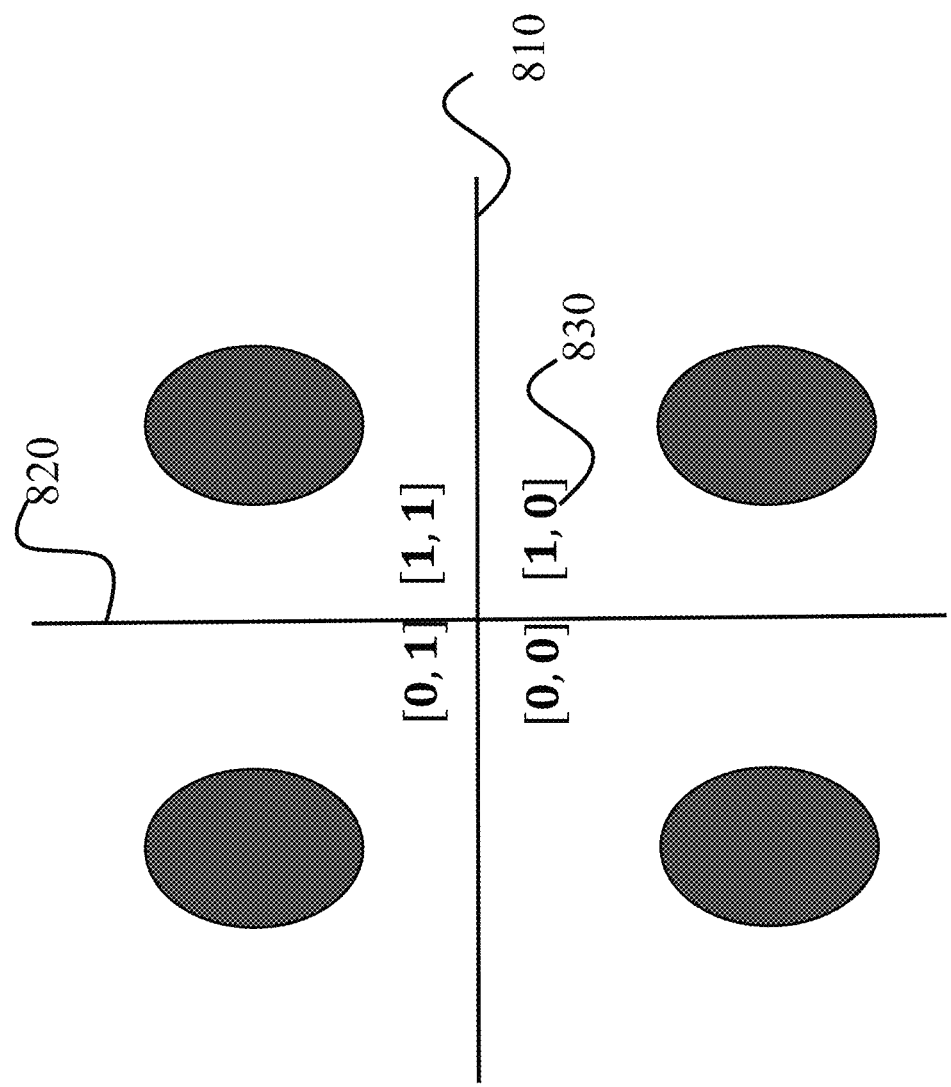
FIG. 8B shows a schematic of exemplar ideal distribution of data in the embedded space according to some embodiments.

FIG. 8B shows a schematic of exemplar ideal distribution of data in the embedded space according to some embodiments. The advantage of learning an appropriate set of features in the embedded space is that it can recover the relevant information, based on a suitable cost function, in a much smaller dimensional space than the original data. Typically, it is difficult to detect system (or machine) states and regimes directly from the measurements of the system for the reasons listed above. However, the information contained in the system measurement can be learned through a non-linear mapping of the sensor data into an embedded space with less dimensions 810 and 820 that in the original input space of operation of the system. Here a non-linear mapping is advantageous because it is this non-linearity that captures the dynamics within time series dimensions, and the relationships between time series dimensions. In particular, the feature learning can be designed to embed the sensor measurements into a new space where conditions and regimes are separated into distinct clusters 830. Here the centroids of the cluster have the property that they attract (via the embedding method) new data points such that once learned the embedding can be used to classify the embedded data. Such a clustering is advantageous for classification, but also advantageous for future predictions. This is because the learned neural network model makes prediction that are linearly separable and belong to the clusters of different fault types. Thus, if correctly learned, the embedding method can make accurate predictions for future fault evolution.

Figure 9:
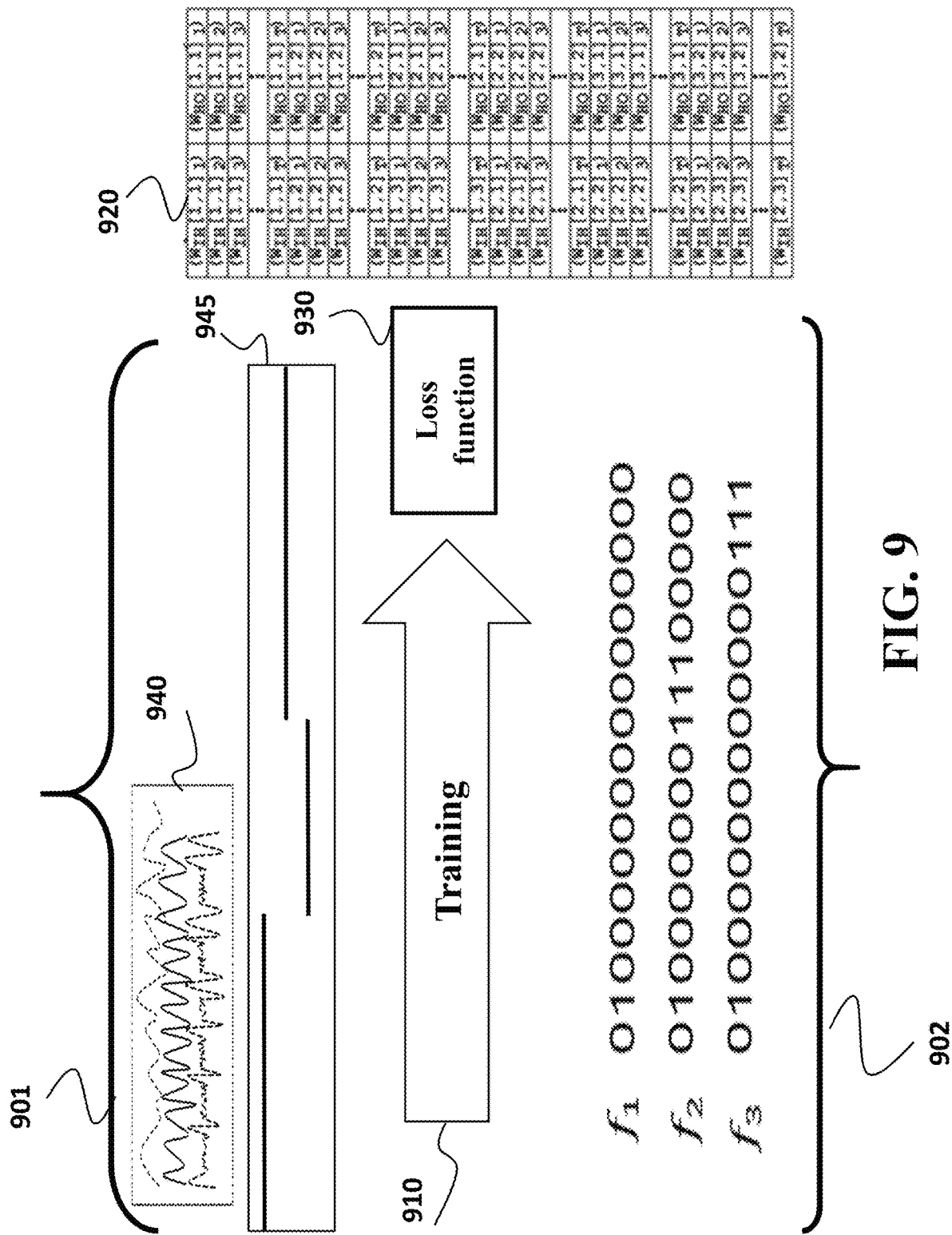
FIG. 9 shows a schematic of the training of the neural network used by some embodiments.

FIG. 9 shows a schematic of the training of the neural network 133 used by some embodiments. In some embodiments, the neural network 133 trained to reduce an error between faults classification and ground truth information. In one embodiment, the first subnetwork and the sequence of the second subnetworks are jointly trained 910 to optimize a loss function 930 providing for an error between faults classification and ground truth information.

In general, training an artificial-neural-network comprises applying a training algorithm, sometimes referred to as a "learning" algorithm, to an artificial-neural-network in view of a training set. A training set may include one or more sets of inputs and one or more sets of outputs with each set of inputs corresponding to a set of outputs. A set of outputs in a training set comprises a set of outputs that are desired for the artificial-neural-network to generate when the corresponding set of inputs is inputted to the artificial-neural-network and the artificial-neural-network is then operated in a feed-forward manner. Training 910 the neural network involves computing the weight values 920 associated with the connections in the artificial-neural-network. To that end, unless herein stated otherwise, the training includes electronically computing weight values for the connections among nodes of the neural network.

For example, in one embodiment, the first subnetwork is trained to transform the time series data into the embedded space to reduce a classification error of the prediction of each fault at the current instance of time performed by the classifier on the corresponding embedded data; and the second subnetwork is trained to predict embedded data for a next instance of time from embedded data for a previous point of time without observations on time series data collected up to the next point of time to reduce an error between predicted embedded data for the next point of time and embedded data for the next point of time transformed by the first subnetwork from the time series data collected up to the next point of time. In such a manner, the performance of the trained neural network can be verified. It is noted even though the network predicts faults at future instants of time, the future time-series data are not predicted, due to the fact that accurate prediction of high-dimension data is very difficult. Furthermore, prediction future multi-dimensional data is not the end-goal. With these considerations, the network predicts the future system states, which is much lower dimensional and thus, achieves much higher accuracy in prediction of faults.

The training 910 uses a training set of pairs of measurements 901 of operation of a machine and corresponding faults 902 in the operation to produce the weights 920 of the neural network 133. The training measurements 901 includes training time-series data 940 collected from multiple sensors measuring the operation of the machine up to an instance of time, as well set points 945 up to the instance of time and for the prediction horizon. The prediction of the neural network are compared with the ground truth information 902 about faults of the machine to evaluate the loss function 930. Based on the evaluation of the loss function 930, the weights 920 of the neural network 133 are updated until a termination condition is met, i.e., the neural network is trained.

Figure 10A:
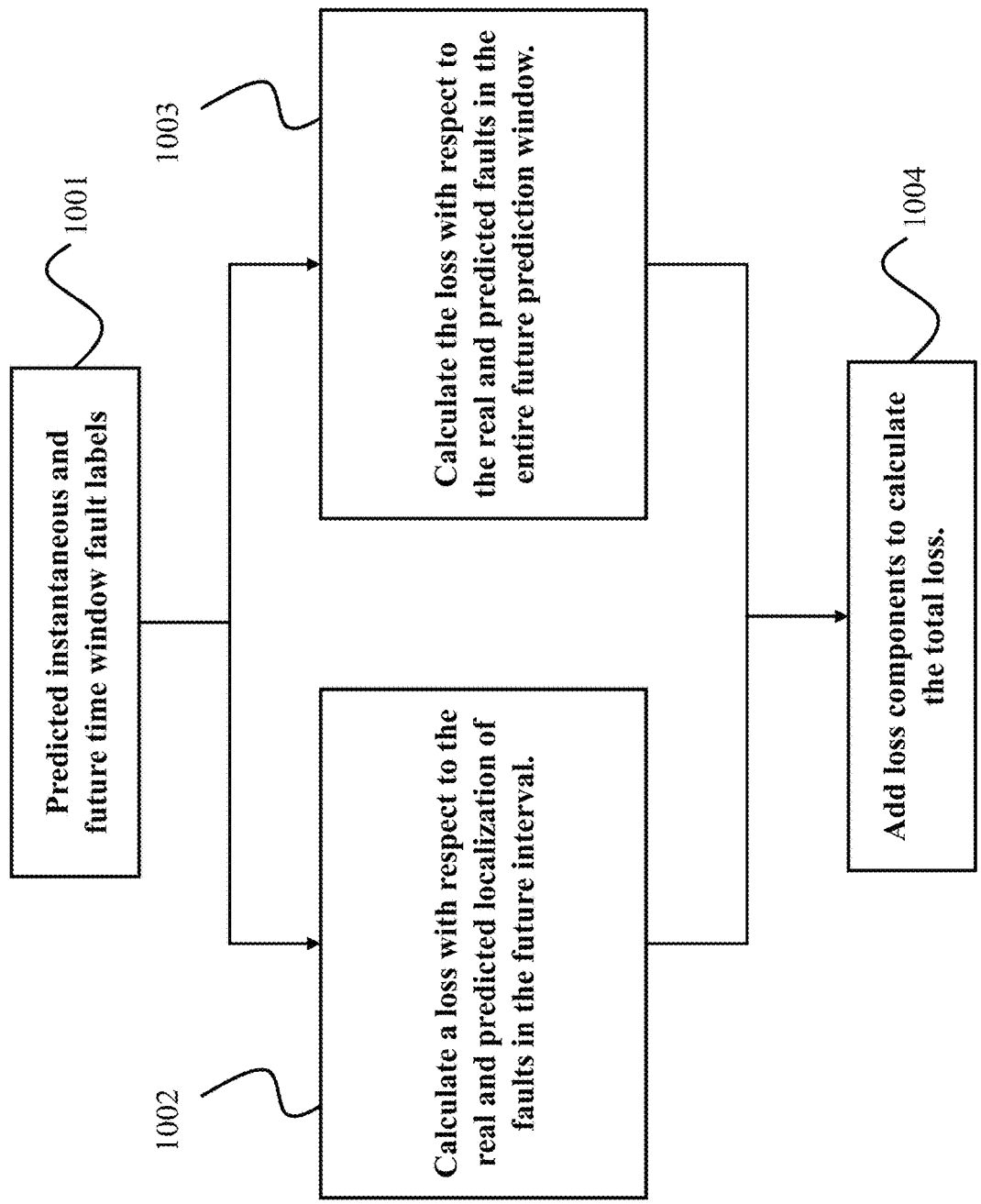
FIG. 10A and FIG. 10B show a block diagram and a schematic of the calculation of the loss function which allows the training of a predictive neural network according to some embodiments.
Figure 10B:
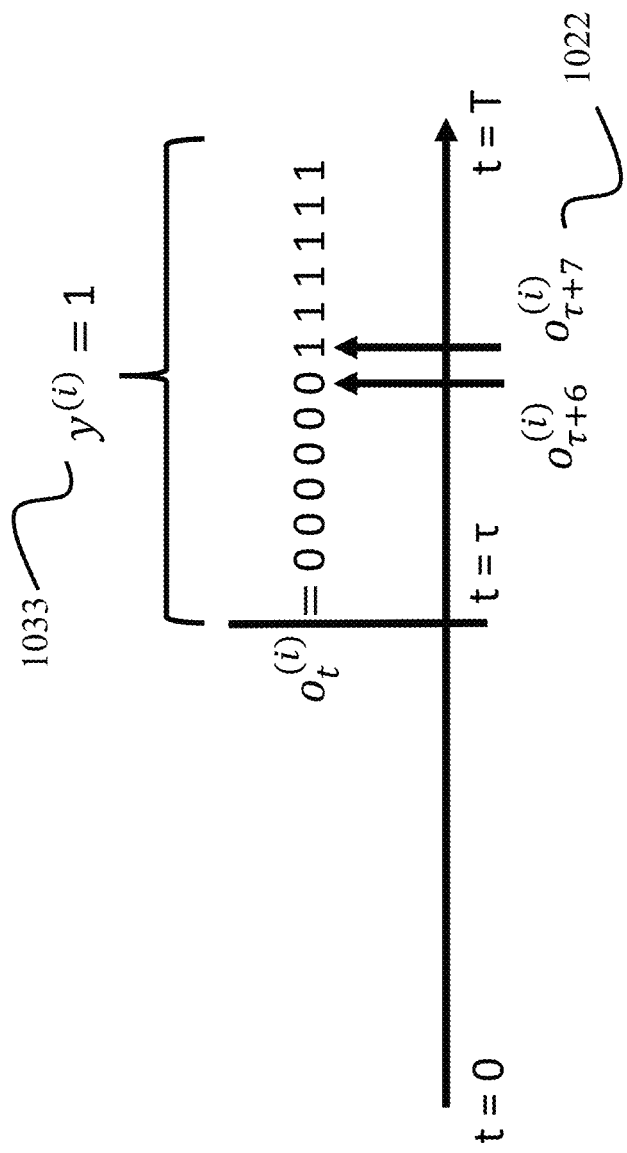

FIG. 10A and FIG. 10B show a block diagram and a schematic of the calculation of the loss function 930 which allows the training of a predictive neural network 133 according to some embodiments. In these embodiments, the loss function 930 includes a combination of a fault occurrence indication 1022 at each time instance and a total fault occurrence 1033 over the prediction horizon. Such a combination improves fault prediction robustness and uses a cross-entropy loss to consider imbalance of the training data and to increase the accuracy of fault prediction.

To that end, in some embodiments, the sequence of the first and second subnetworks are trained together to transform 1001 the time series data into the embedded space to reduce 1003 the classification error with respect to the fault prediction 1033 on the entire future prediction interval and to reduce 1002 the classification error with respect to each instant 1022 in the future time series segment. The latter is referred to as error localization because minimizing this error for each instant, provides the ability to localize when a fault will have occurred in the future. The total loss function value 1004 is a combination, e.g., the sum of these two loss components.

Some embodiments are based on the realization that prediction of faults where the faults may occur in any possible combinations may naturally lead to an imbalance in the dataset used for training. For example, it is possible that a system can run normally for a long period of time and incurs faults for a very small fraction of its operation. However, the effectiveness of a machine learning algorithm can be diluted by training data that is imbalanced in the number of examples of faults of several kinds. Furthermore, some embodiments are based on the realization that learning the correct embedding and fault dynamics requires designing a loss function which explicitly models the imbalance in the fault classes that may be present in the training data.

To this end, the loss function components can be described as follows. The first component 1033 which penalizes classification error over the whole future segment is mathematically expressed as:

$$L_Y^{(i)} = -\sum_{l=1}^{L} [w_l \tilde{y}^{(i)}[l] \log(y^{(i)}[l]) + (1 - \tilde{y}^{(i)}[l]) \log(1 - y^{(i)}[l])]$$

Where $y^{(i)}$ is a vector of L individual fault label values, for the ith sample of data from a given system. Each value in the vector can be retrieved as $y^{(i)}[l]$. The true vector of fault labels is denoted as $\tilde{y}^{(i)}$. The sample weight $w_l$ is defined as $w_l = -\log(p_l)$ where $p_l$ is the probability of occurrence of a given label in the training data set. This weighting is the method used herein to account for faults observed in the data that occur infrequently.

The second component 1022 which penalizes classification error with respect to each time instant in the future is described as follows:

$$L_o^{(i)} = \frac{1}{T-\tau+1} \sum_{t=\tau+1}^{T} [\tilde{o}_t^{(i)} \cdot (1 - o_t^{(i)})^2 + (1 - \tilde{o}_t^{(i)}) \cdot (o_t^{(i)})^2]$$

here $o_t^{(i)} = \sigma(h_t^{(i)}) y^{(i)}$ is the stepwise prediction of the fault label vector, where $h_t^{(i)}$ is the state of the second subnetwork after each future prediction step, and $\sigma(\ )$ is the sigmoid function. As before $\tilde{o}_t^{(i)}$ is the true stepwise label denoting the presence of absence of each individual fault at each future step in time.

Lastly, combining these two components of the loss function is performed as:

$$L^B = \frac{1}{|B|} \sum_{i \in B} [L_Y^{(i)} + L_o^{(i)}] + \frac{\lambda}{2} \|W\|^2$$

Where B is the set of measurements collected on the system, and W is the set of weights of the two neural subnetworks.

In some embodiments the loss function is the objective which is used to train the embedding function such that the time series conditions are separated in the embedded space. In various embodiments, the loss function is designed to have one or combination of the following properties. The probability of label occurrence in the training set, p, is used as a weight in a cross-entropy loss component such that labels that occur less frequently are well learned during training. Additionally or alternatively, the loss function is designed to include product of the per step fault occurrence probability with the total future window fault occurrence probability which by construction forces the network to learn faults at any given instant, only when a fault exists on the entire future segment. This helps the neural network to avoid making unnecessary mistakes in prediction by using the label of the entire prediction horizon. Additionally or alternatively, the loss function is designed to include only per fault embedding loss penalty, such that faults can be examined individually per dimension in the embedded space, thereby avoiding training the model on the power set of possible fault combinations.

Using the cost/loss function, the neural network is trained to minimize the total predictive error for all the faults over a certain time horizon given a target set-point for every time instant. The prediction is made one step at a time, this prediction is then fed-back along to the neural network along with the target set-point and the hidden state of the neural network to make a prediction on the next-time instant. This process is repeated over the desired predictive horizon. Thus, at every time-instant, the network predicts a vector of dimension equal to the number of faults occurring in the system. The network is trained to jointly minimize the predictive error over the entire time-horizon in order for it to be able to learn the predictive dynamics of the faults.

Figure 11:
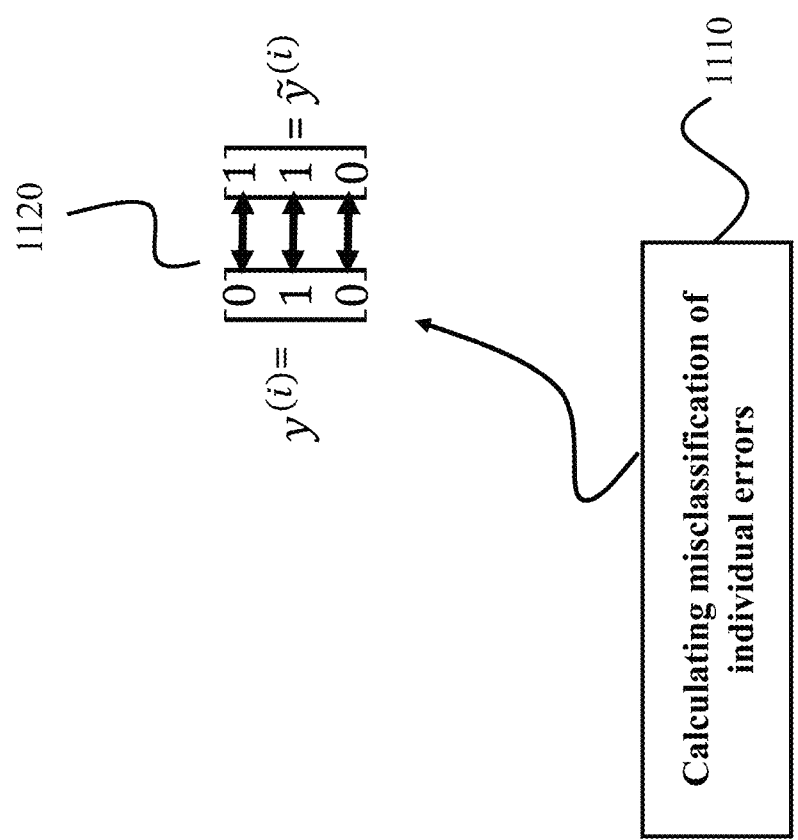
FIG. 11 shows a schematic of evaluation of a loss function for individual fault prediction according to some embodiments.

FIG. 11 shows a schematic of evaluation of a loss function 930 for individual fault prediction according to some embodiments. In these embodiments, the second subnetwork of the predictive neural network 133 output individual prediction of each fault of a plurality of faults at the corresponding future instance of time.

Some embodiments are based on realization the complexity of the predictive problem can be further reduced by predicting each fault separately. This is motivated by the realization that since the occurrence of the individual faults is being modeled by a predictive model, the faults can be predicted independent of each other. As a result of this simplification, the dimension of the predicted vector is reduced to the number of faults occurring in the system instead of all the possible combinations of faults in the system. This simplification also allows to alleviate the sample complexity of the neural network as it has to learn fewer classes. These realizations are used when defining the loss function 930 such that the loss is only calculated 1110 on the misclassification of individual errors 1120 and not on the total error label vector. There is no loss component that emphasizes the cross-correlation between different components of the label vector.

In such a manner, this disclosure presents a system and method for prediction of multiple faults in complex systems operated to achieve certain target set points and equipped with multiple sensors resulting in multi-dimensional time-series measurements. The machine learning algorithm proposed in the disclosure uses a neural network to learn an embedding of the multi-dimensional time-series. A dynamic relationship between the faults occurring in the future is learned using the low-dimensional embedded state and a cost function designed to force the neural network to predict one fault at a time and then use the predicted fault at the next time instant to predict faults occurring further ahead in time. The proposed method reduces error in prediction of faults by prediction faults instead of predicting multi-dimensional sensor signal itself.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

What is claimed:

1. A system for evaluating a plurality of faults in an operation of a machine at a set of future instances of time forming a prediction horizon, comprising:
   an input interface configured to accept, during the operation of the machine, input data including
      current time-series data collected from multiple sensors measuring the operation of the machine over a period of time including multiple time instances up to a current instance of time;
      a set of current set points for the operation of the machine within the period of time; and
      a set of future set points of the operation of the machine for a set of future instances of time forming a prediction horizon;
   a memory configured to store a neural network including a first subnetwork sequentially connected with a sequence of second subnetworks such that an output of one subnetwork is an input to a subsequent subnetwork, wherein there is a second subnetwork for each of the future instance of time within the prediction horizon, wherein the first subnetwork accepts the current time-series data and the current setpoints, wherein each of the second subnetworks accepts the output of a preceding subnetwork, an internal state of the preceding subnetwork, and a future setpoint for a corresponding future instance of time, and wherein each of the second subnetworks outputs an individual prediction of each fault of a plurality of faults at the corresponding future instance of time;

a processor configured to submit the input data received from the input interface to the neural network to estimate individual predictions of each fault of the plurality of faults at each of the future instances of time; and an output interface to output the individual predictions of each of the faults.

2. The system of claim 1, wherein the memory is configured to store a binary classifier trained to classify the predictions of each fault to produce a binary vector of a multi-label fault, wherein the output interface outputs the binary vector.

3. The system of claim 2, wherein a number and types of the sensors form dimensions of an operation space, wherein the first subnetwork is trained to transform the time series data in the operation space into embedded data in an embedded space with dimensions less than the dimensions of the operation space, and wherein each of the second subnetworks is trained to estimate evolution of the embedded data in the embedded space for the corresponding future instance of time.

4. The system of claim 3,
wherein the first subnetwork is trained to transform the time series data into the embedded space to reduce a classification error of the prediction of each fault at the current instance of time performed by the classifier on the corresponding embedded data; and
wherein the second subnetwork is trained to predict embedded data for a next instance of time from embedded data for a previous point of time without observations on time series data collected up to the next point of time to reduce an error between predicted embedded data for the next point of time and embedded data for the next point of time transformed by the first subnetwork from the time series data collected up to the next point of time.

5. The system of claim 4, wherein the first subnetwork and the sequence of the second subnetworks are jointly trained to optimize a loss function.

6. The system of claim 5, wherein the classifier is a third neural network jointly trained with the first subnetwork and the sequence of the second subnetworks.

7. The system of claim 5, wherein the loss function estimates a prediction error for each type of fault independently of the other fault types.

8. The system of claim 5, wherein a probability of label occurrence in a training dataset is used as a weight in a cross-entropy loss component of the loss function.

9. The system of claim 5, wherein the loss function includes a combination of a fault occurrence indication at each time instance and a total fault occurrence indication over the prediction horizon.

10. The system of claim 5, wherein the loss function includes only per fault embedding loss penalty.

11. The system of claim 1, wherein the output of the first subnetwork is an embedding of the current time-series data and the current set points.

12. The system of claim 1, wherein the output of the second subnetwork includes a prediction of the label output at the corresponding future instance of time and a prediction of the labeled output over the prediction horizon.

13. The system of claim 1, wherein the processor is configured to control the machine based on the individual predictions of each of the faults.

14. A method for evaluating a plurality of faults in an operation of a machine at a set of future instances of time forming a prediction horizon, wherein the method is coupled with stored instructions implementing the method, wherein the instructions, when executed by the processor carry out steps of the method, comprising:

accepting, during the operation of the machine, input data including current time-series data collected from multiple sensors measuring the operation of the machine over a period of time including multiple time instances up to a current instance of time; a set of current set points for the operation of the machine within the period of time; and a set of future set points of the operation of the machine for a set of future instances of time forming a prediction horizon;

submitting the input data received from the input interface to a neural network to estimate individual predictions of each fault of the plurality of faults at each of the future instances of time, the neural network including a first subnetwork sequentially connected with a sequence of second subnetworks such that an output of one subnetwork is an input to a subsequent subnetwork, wherein there is a second subnetwork for each of the future instance of time within the prediction horizon, wherein the first subnetwork accepts the current time-series data and the current setpoints, wherein each of the second subnetworks accepts the output of a preceding subnetwork, an internal state of the preceding subnetwork, and a future setpoint for a corresponding future instance of time, and wherein each of the second subnetworks outputs an individual prediction of each fault of a plurality of faults at the corresponding future instance of time; and outputting the individual predictions of each of the faults.

15. A non-transitory computer readable storage medium embodied thereon a program executable by a processor for performing a method, the method comprising:

accepting, during the operation of the machine, input data including current time-series data collected from multiple sensors measuring the operation of the machine over a period of time including multiple time instances up to a current instance of time; a set of current set points for the operation of the machine within the period of time; and a set of future set points of the operation of the machine for a set of future instances of time forming a prediction horizon;

submitting the input data received from the input interface to a neural network to estimate individual predictions of each fault of the plurality of faults at each of the future instances of time, the neural network including a first subnetwork sequentially connected with a sequence of second subnetworks such that an output of one subnetwork is an input to a subsequent subnetwork, wherein there is a second subnetwork for each of the future instances of time within the prediction horizon, wherein the first subnetwork accepts the current time-series data and the current setpoints, wherein each of the second subnetworks accepts the output of a preceding subnetwork, an internal state of the preceding subnetwork, and a future setpoint for a corresponding future instance of time, and wherein each of the second subnetworks outputs an individual prediction of each fault of a plurality of faults at the corresponding future instance of time; and outputting the individual predictions of each of the faults.

* * * * *